Figure 1:
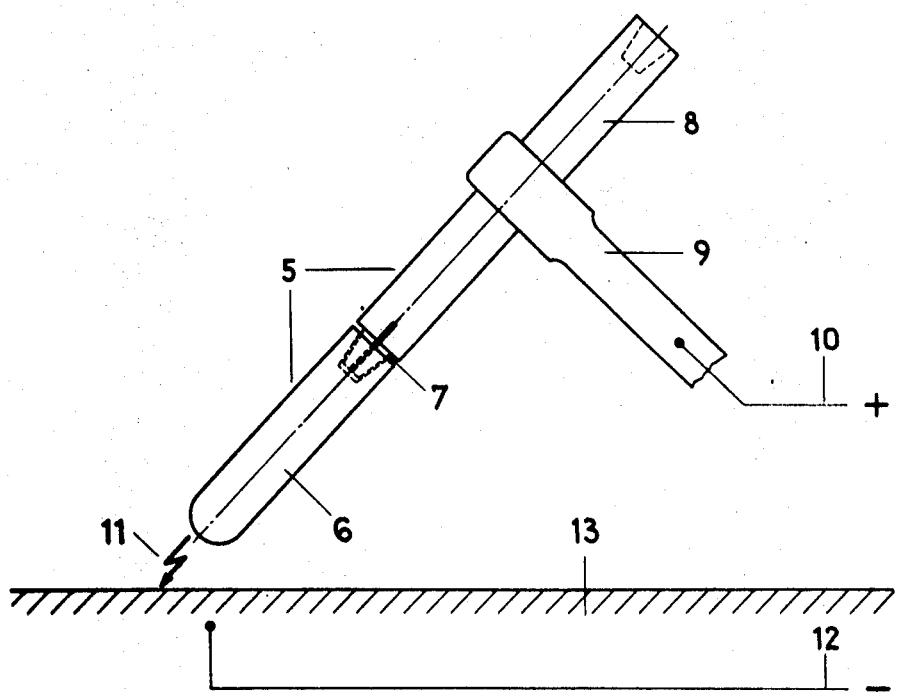

United States Patent

[11] 3,621,187

[72] Inventors: Bernard Reichelt, Nurnberg-Laufamholz; Richard Winter, Altdorf, both of Germany
[21] Appl. No.: 841,321
[22] Filed: July 14, 1969
[45] Patented: Nov. 16, 1971
[73] Assignee: C. Conradty, Nurnberg, Germany
[32] Priority: Dec. 27, 1968
[33] Germany
[31] P 18 17 096.2

[54] SECTIONAL CUTTING OR WELDING ELECTRODE
4 Claims, 2 Drawing Figs.
[52] U.S. Cl. .................................................... 219/145
[51] Int. Cl. ..................................................... B23k 35/00
[50] Field of Search ......................................... 219/145; 13/18

[56] References Cited
UNITED STATES PATENTS

| | | | |
|---|---|---|---|
| 2,527,294 | 10/1950 | Bailey .......................... | 13/18 |
| 1,512,786 | 10/1924 | Morton ......................... | 219/145 |
| 3,131,290 | 4/1964 | Stepath ......................... | 219/145 |
| 3,399,322 | 8/1968 | Ambe ............................ | 219/145 |

Primary Examiner—J. V. Truhe
Assistant Examiner—Lawrence A. Rouse
Attorney—Walter Becker ABSTRACT: An electrode of carbon material, especially for cutting and welding, which has one end provided with a conical plug and has its other end provided with a socket having a complimentary inner conical surface, and in which the outer surface of the plug and at least that one third of the inner conical surface of said socket which comprises the largest diameter of said inner conical surface is provided with a metallic coating.

SECTIONAL CUTTING OR WELDING ELECTRODE

The present invention relates to carbon electrodes for cutting, welding, and cleaning of steel. Electrodes of this type are customarily mounted on holders therefor and are manually or automatically fed toward the workpiece. Electric current is conveyed through said holder to said carbon electrode and builds up an arc required for the cutting and welding operation to be carried out.

In order to prevent the holder from being damaged when the electrode has burned off to a major extent, it is necessary either to discard the residual electrode or, by means of a plug connection, to plug the residual electrode into a new electrode or vice versa.

With heretofore known plug connections of welding electrodes as disclosed e.g. in U.S. Pat. Nos. 3,030,544 and 3,131,190, French Pat. No. 1,383,904 and German Auslegeschrift No. 1,270,707, the copper jacket is interrupted at the area of connection so that the entire current flow at said area has to be passed through the carbon material. In view of the rather high resistance at the transition area a premature scaling and overheating will occur at said area of connection when the electrode is being employed, which fact not infrequently results in an accidental disengagement of the connection.

Furthermore, with the said known plug connection, the air entrapped between the bottom surface of the hollow cone sleeve of said connection and the end face of the plug or stud will, in view of the developing heat, expand thereby aiding or bringing about an accidental disengagement of the said plug connection. While by providing a bore in said plug, a venting of the entrapped air can be obtained, there exists the danger that the said venting bore clogs up by a premature melting off of the copper jacket. Moreover, a proper venting of the gases being formed from between the conical socket and the conical plug is not assured.

It is, therefore, an object of the present invention to provide a connectable electrode which will overcome the above-mentioned drawbacks.

It is another object of this invention to provide a connectable electrode having one end designed as conical socket and the other end as conical plug which will make it possible to interconnect two of said electrodes in such a way that a safe and reliable connection will be established and maintained throughout the life of the respective electrode in operation.

These and other objects and advantages of the invention will appear more clearly from the following specification in connection with the accompanying drawing, in which:

FIG. 1 diagrammatically illustrates in view a socket plug electrode connection according to the present invention.

Figure 2:
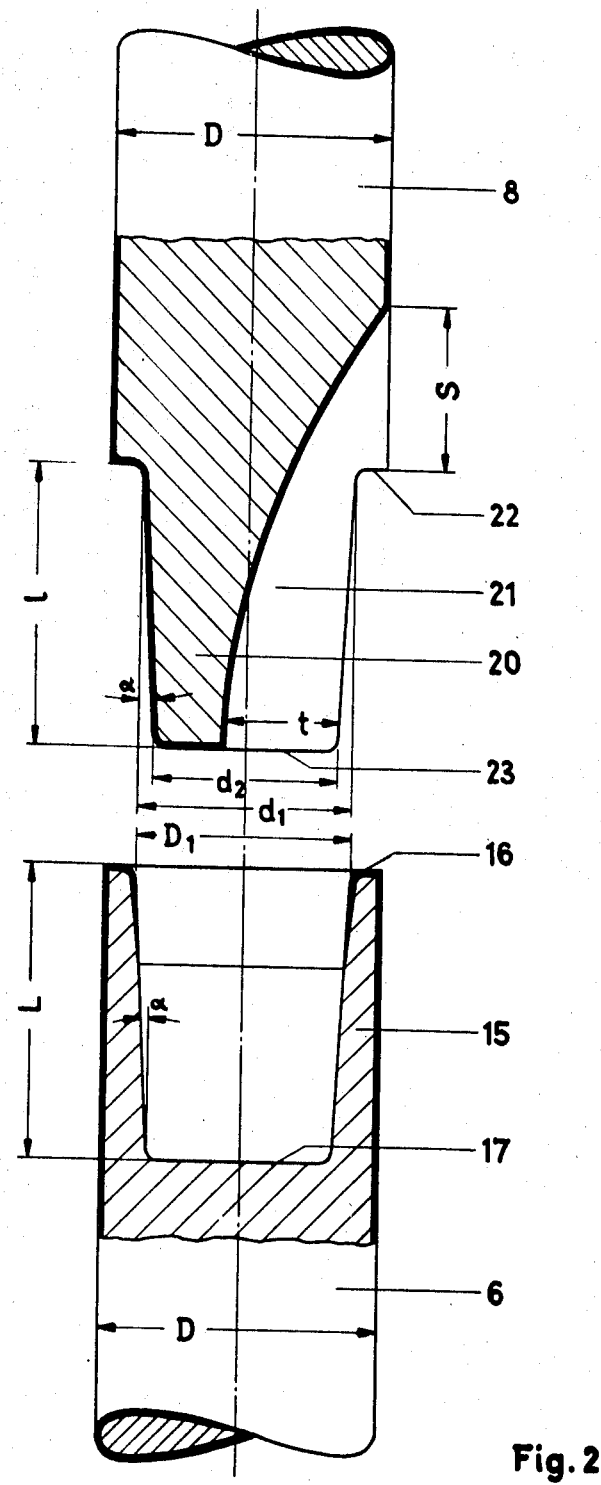

FIG. 2 shows on a considerably enlarged scale the two electrode ends partially sectioned.

The electrode according to the invention which has a conical plug at one end and a conical socket on the other end, is characterized primarily in that the entire conical stud or plug and at least one-third of that conical socket section which contains the greatest diameter of said conical socket is metallized so that a minimum contact resistance will be assured between said socket and said plug.

According to a further feature of the present invention, the electrode has its conical plug provided with a groove extending in the longitudinal direction of said plug for venting the space between the end face of the plug and the bottom of the socket receiving the same and serving as discharge passage for the gases forming between the conical surfaces of said plug and socket. The longitudinal groove also brings about a certain clamping effect, especially in view of the increased copper deposit at the edges of the groove interrupting the metallic cover of said conical plug surface. The metallic cover for the conical surface of said plug and socket may be selected from any good conductor such as Cu, Ag, Au, Ni, Rh, Pt.

Referring now to the drawing in detail, the welding and cutting electrode 5 illustrated in FIG. 1 comprises the partially used up electrode 6 which at the connecting area 7 is connected to a new electrode 8. The electrode 5 is supported by a holder 9 which receives high-voltage current through a cable 10. The arc 11 between the electrode and the workpiece 13 which is connected to the negative pole 12 brings about the burning off or consumption of the electrode.

FIG. 2 illustrates the two electrodes prior to their connection to each other. As will be seen from FIG. 2, the rear end of the partially burned-off electrode 6 comprises a socket 15 with an inner conical surface while the front end of the new electrode 8 is provided with a conical stud or plug 20 having its outer surface provided with a metallic layer, for instance, a copper layer.

The conical plug 20 is characterized by its largest diameter $d_1$, its length 1 and the conical angle $\alpha$. According to a preferred embodiment of the invention, $d_1$ is less than 75 percent and 1 is greater than 100 percent of the electrode diameter D. The angle $\alpha$ is preferably selected from between 1° and 3°.

Furthermore, according to a preferred embodiment of the invention, the conical stud 20 has a venting groove 21 provided therein which is so designed that the depth $t$ is greater than 50 percent of $d_2$ and the length S equals approximately D, while the width of the groove may be within the range of from 5 to 20 percent of $d_2$.

The inner conical surface of the socket 15 of electrode 6 has substantially the same conical angle as the outer surface of the plug 20. The diameter $D_1$ is somewhat smaller than $d_1$ so that when the electrode 8 is plugged into the electrode 6, the annular surfaces 16 and 22 are spaced from each other by at least 2.5 millimeters. The length L is preferably by 5 percent longer than 1.

The socket 15 and the plug 20 are at their end faces 17 and 23 and at the annular surfaces 16 and 22 rounded off preferably by radii of from 0.5 to 2.5 millimeters. In view of the above outlined features of the present invention, an intimate and firm frictional connection will be stablished when the electrode sections are plugged into each other, which connection will become even firmer by melting of the copper during the heating of the electrode so that an accidental disengagement of the electrode sections will, for all practical purposes, be impossible.

As will be evident from the above, with the electrode according to the present invention the front end of the electrode may selectively be formed either by the plug or by the socket. However, it is preferable to employ the plug as the front end inasmuch as it makes the ignition easier. It will also be evident that new electrodes can be continuously fitted into the burned-off electrodes while the electrode is continuously advanced. As will furthermore be evident from the above, the electrode according to the present invention makes it possible to carry out operations of any duration without interruption.

It is, of course, to be understood that the present invention is, by no means, limited to the particular showing in the drawing but also comprises any modifications within the scope of the appended claims.

What we claim is:

1. An electrode of carbon material exclusively for welding and cutting operations, especially for cutting and welding, having one end provided with a conical plug of carbon material and having its other end provided with a socket also of carbon material having an inner conical surface, in which the outer surface of said plug and only approximately at least that one-third of the inner conical surface of said socket which comprises the largest diameter of said inner conical surface of carbon material are covered by a metallic layer, said metallic layer covered conical surface of said plug of carbon material and said metallic layer covered conical surface of said socket of carbon material being designed complementary to each other so that of two identical electrodes each having one end in the form of a plug and the other end in the form of a socket one end of one electrode will fit into another end of the other electrode, and means forming a venting groove extending longitudinally from the end of said plug beyond said conical surface of said plug thereby always during welding and cutting operations obviating trapping of gases in said socket.

2. An electrode according to claim 1, in which only the conical plug of carbon material is provided with said means forming the venting groove extending in the longitudinal direction of said plug itself for a distance longer purposely than tapered interfit of said plug and said socket simultaneously for positively always venting gases forming during the operation of the electrode between said plug and said socket and for enhancing the clamping effect between said plug and said socket.

3. An electrode according to claim 2, in which in said plug exclusively the depth of said groove extends angularly and at least at one end of said groove exceeds 50 percent of the smallest diameter of said plug itself whereas the width of said groove is within the range of from 5 to 20 percent of said smallest diameter of said plug, the length of said groove measured at the outer periphery of said plug itself at least slightly more than equaling approximately the diameter of the electrode.

4. An electrode according to claim 3, in which said metallic layer is made of a metal selected from the group consisting of Cu, Ag, Au, Ni, Rh, Pt.

* * * * *